United States Patent Office 2,769,476
Patented Nov. 6, 1956

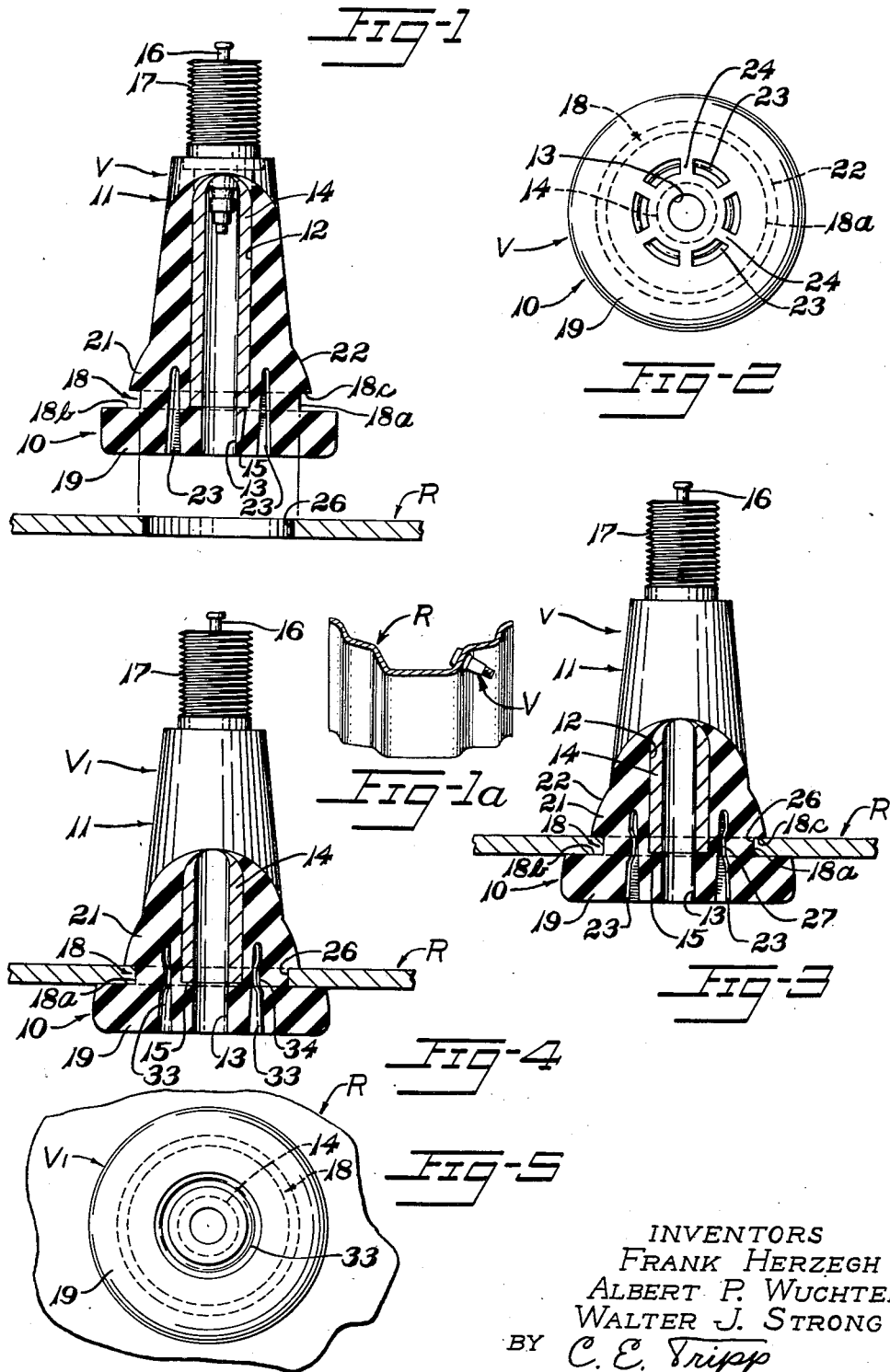

2,769,476

RUBBER TIRE VALVE ASSEMBLY

Frank Herzegh, Cleveland, Albert P. Wuchter, Akron, and Walter J. Strong, Cuyahoga Falls, Ohio, assignors to The B. F. Goodrich Company, New York, N. Y., a corporation of New York Application March 26, 1953, Serial No. 344,794

7 Claims. (Cl. 152—427)

This invention relates to an inflating valve of the type wherein the valve body is formed of rubber-like material, the valve being mounted in an apertured wall by forcing a retaining flange of the valve material through the aperture in the wall. Such valves are particularly useful with the metallic rims fitted with tubeless tires. These valves eliminate expensive screw and nut clamps and their associated gaskets, but have presented problems of leak-proof operation due to their inherently flexible construction.

Principal objects of the invention are to facilitate assembly of the valve with its supporting wall; to provide a long-life resilient air-tight seal with the edge of the wall aperture; to facilitate the sealing action of the fluid under pressure within the tire and rim and to accommodate flexing of the valve stem on the rim without causing leakage. Briefly these objects are accomplished by providing a rubber valve body having a stem portion and a base portion, the latter being grooved to provide opposed flanges for embracing the apertured rim wall. Cavities, or a cavity, are molded into the base portion between the groove and the inflating aperture of the valve body. These cavities permit making the groove base diameter considerably larger than the diameter of the aperture in the rim, because when the valve is snapped into place, flow of rubber resulting from the aforesaid differences in diameter is accommodated by the cavities.

Several advantages arise in that, first the rubber is under more resilient loading at the rim wall edge than if the valve body were solid, and hence even though the diameter differences are substantial, permanent setting of the rubber and axial separation of the opposed flanges are not encountered. Second, if the cavities are made open to the inside of the rim, air under pressure tends to expand them and augment the seal against the edge of the rim aperture. Third, the end of the metal insert nipple, customarily found in such valves, may overlie the cavity and when flexing of the valve stem occurs the corresponding motion of the end of the insert will be accommodated by flow of the rubber into the cavity. Fourth, the presence of the cavities reduces the quantity of rubber required, not only due to the cavities themselves, but due to the fact that the improved sealing action makes a large inner flange unnecessary.

The following detailed description of a preferred embodiment of the invention will enable one skilled in the art to attain the aforesaid advantages by practicing the invention.

In the drawings,

Fig. 1 shows a partly sectioned valve, formed in accordance with the invention, before insertion into a rim flange.

Fig. 1A is a section through conventional drop center rim showing the valve of the invention mounted in the rim.

Fig. 2 is a bottom view of the valve.

Fig. 3 shows the valve in place in the rim.

Fig. 4 is a partially sectioned view of a modified form of valve in place in the ring.

Fig. 5 is a bottom view of the assembly of Fig. 4.

The valve V in Figs. 1 and 2 comprises a body formed of vulcanized carbon black rubber material of the type commonly employed for use on vehicle inner tube valves or the like. The valve body includes a base portion 10 and a stem or shank portion 11 and is molded with an axial passageway 12 having a necked-down inner end portion 13. A nipple insert 14 formed of brass or the like is bonded to the wall of passageway 12 and its inner end 15 terminates at the shoulder forming the junction of the passageways 12 and 13.

The usual valve insides 16 are threaded into the nipple 14 which serves as a check valve mounting means in the conventional manner. An exposed end of the nipple is threaded as at 17 for the valve cap. The base portion 10 of the rubber valve body is provided with a groove 18 for receiving the rim. The groove has an annular bottom wall 18a for resilient engagement with the edge of the rim aperture and opposed planar walls 18b and 18c for engaging opposite sides of the rim. As a result of the groove the base portion of the valve body is divided into an inner end flange 19 the end face of which faces inwardly relative to the rim, and an intermediate flange 21, the latter of which is tapered as at 22 to facilitate forcing the valve body into the rim aperture. An important feature of the preferred embodiment of the invention is the annular row of cavities 23 extending from the inner side of flange 19 into the valve base which cavities in this form are circumferentially spaced so as to provide intermediate webs 24, as best seen in Fig. 2. These cavities are formed during molding by corresponding projections extending from one mold part, it being understood that the molding operation forms no part of this invention. It will be noted that in the form shown the end 15 of the nipple 14 overlies both the groove 18 and the cavities in the axial direction.

As indicated in Fig. 1, the aperture 26 in the rim R is of appreciably smaller diameter than that of the bottom wall 18a of the groove in the valve. The valve is inserted in the rim by forcing flange 21 through the aperture 26 from the inside, the taper 22 facilitating deformation of flange 21. When flange 21 has passed through rim aperture 26, the rim extends into the groove 18. Since rim aperture 26 is smaller in diameter than groove wall 18a, material at the valve body cavities will be bulged inwardly as at 27, Fig. 3, and the webs 24 will be radially shortened and bulged circumferentially into the cavities, the result being a resilient sealing engagement between the bottom wall 18a of the valve body groove and the edge of the rim aperture. When the tire and rim assembly are completed and the tire inflated, air under pressure backed up by the inner end portion of the nipple 14, will further tend to expand the wall 18a of the groove against the edge 26 of the rim and augment the seal.

Due to the presence of the cavities, tilting or flexing of the stem portion 11 of the valve is accommodated and does not tend to lift wall 18b of flange 19 away from the associated rim area. Since there is an unbalanced pressure on flange 19 tending to cause a seal at wall 18b, this is an important advantage. It will also be noted that the cavities can further deform in response to motion of the inner end portion of nipple 14 so that there is little tendency for the nipple to break the seal. Furthermore, the presence of the cavities makes it possible to form flange 19 with a minimum of rubber and the cavities themselves reduce the amount of rubber required, so that all of the aforesaid advantages are attained in practice at a reduction in cost.

It will be noted that webs 24 resist the tendency of air-pressure over the area bounded by the cavities to displace the central zone of the valve through aperture 26 in the rim, which displacement might distort the parts and reduce the effectiveness of the seal, or in severe cases might expel the valve through the rim aperture.

The embodiment of the invention shown in Figs. 4 and 5 has a different cavity arrangement. The valve V–1 of this form is in most respects like that just described and like parts have been given like numerals. In this respect, however, a single annular cavity 33 extends inwardly from the inner space of the valve body intermediate the central bore and the groove 18. When the valve is assembled in the rim, as previously described, the difference in diameter between the rim aperture 26 and the grooved wall 18a is again accommodated by a bulging into the cavity as at 34. This form has additional advantages over the previously described form in that there is a greater saving in rubber and a slight increase in flexibility of the valve body. On the other hand the resistance of the central zone of the valve to axial outward displacement under air pressure is not as great as that in the first embodiment of the invention because of the lack of webs 24.

Having described the invention so that those skilled in the art may practice the same, I contemplate that modifications thereof may be made without departing from the invention as defined in the appended claims.

We claim:

1. A quickly attachable inflating valve for mounting in an aperture in a tire rim comprising a body of rubber-like material having a base portion and a stem portion extending axially from said base portion, said base portion having an annular wall for engaging the edge of the rim aperture, said base portion having a groove formed therein, said groove dividing the base portion into opposed flanges for engaging opposite sides of the rim around the rim aperture, a bore through said valve body, a rigid insert bonded to said body within said bore, said base portion having a hollow portion in the radial zone between said bore and said annular wall and in the axial zone that is at least coextensive with said groove whereby restriction of said annular wall by the rim is accommodated by deformation of the rubber about and into said hollow portion of said base portion.

2. A quickly attachable inflating valve for mounting in an aperture in a tire rim comprising a body of rubber-like material having a base portion having an end face and a stem portion extending axially from said base portion, said base portion having an annular groove formed therein, the bottom of said groove forming an annular wall for engaging the edge of the rim aperture, said groove dividing the base portion into opposed flanges for engaging opposite sides of the rim around the rim aperture, a bore through said valve body, a rigid insert bonded to said body within said bore, and a plurality of circumferentially spaced cavities extending axially into said base portion from the end face thereof, said axially extending cavities being disposed between said bore and said annular wall whereby restriction of said annular wall by the rim is accommodated by deformation of the rubber about and into said cavities.

3. In combination, a tire rim having laterally spaced tire mounting portions and a wall portion between said spaced portions, an aperture in said wall portion, a quickly attachable inflating valve comprising a body of rubber-like material having a base portion having an end face and a stem portion extending axially from said base portion, said base portion having an annular groove formed therein, the bottom of said groove forming an annular wall engaging the edge of said rim aperture, said groove dividing the base portion into opposed flanges engaging opposite sides of the rim around the rim aperture, a bore through said valve body, a rigid insert bonded to said body within said bore, and a plurality of circumferentially spaced cavities extending axially into said base portion from the end face thereof, said axially extending cavities being disposed between said bore and said annular wall, the circumference of said groove bottom wall being initially greater than that of said rim aperture, restriction of said bottom wall by the rim being accommodated by deformation of the rubber about and into said cavities.

4. A quickly attachable inflating valve for mounting in an aperture in a tire rim comprising a body of rubber-like material having a base portion having an end face and a stem portion extending axially from said base portion, said base portion having an annular groove formed therein, the bottom of said groove forming an annular wall for engaging the edge of the rim aperture, said groove dividing the base portion into opposed end and intermediate flanges for engaging opposite sides of the rim around the rim aperture, a bore through said valve body, a rigid insert bonded to said body within said bore, and a plurality of circumferentially spaced cavities extending axially into said base portion from the end face thereof, said axially extending cavities being disposed between said bore and said annular wall whereby restriction of said annular wall by the rim is accommodated by deformation of the rubber about and into said cavities, said insert extending from the free end of said stem portion to a zone substantially within the axial plane of said groove whereby relative displacement of said insert upon flexing of said valve body is accommodated by said cavities.

5. A quickly attachable inflating valve for mounting in an aperture in a tire rim comprising a body of rubber-like material having a base portion having an end face and a shank portion extending axially from said base portion, said base portion having an annular groove formed therein, the bottom of said groove forming an annular wall for engaging the edge of the rim aperture said groove dividing the base portion into opposed end and intermediate flanges for engaging opposite sides of the rim around the rim aperture, a bore through said valve body, a rigid insert bonded to said body within said bore, and a plurality of circumferentially spaced cavities extending axially into said base portion from the end face thereof, said axially extending cavities being disposed between said bore and said annular wall whereby restriction of said annular wall by the rim is accommodated by deformation of the rubber about and into said cavities, said insert extending from the free end of said shank portion to a zone substantially within the plane of said groove, said cavities extending past the inner end of said insert and terminating substantially at said intermediate flange, whereby said intermediate flange is stabilized by said insert and relative displacement of said insert upon flexing of said valve body is accommodated by said cavity.

6. A quickly attachable inflating valve for mounting in an aperture in a tire rim comprising a body of rubber-like material having a base portion having an end face and a stem portion extending axially from said base portion, said base portion having an annular groove formed therein, the bottom of said groove forming an annular wall for engaging the edge of the rim aperture said groove dividing the base portion into opposed flanges for engaging opposite sides of the rim around the rim aperture, a bore through said valve body, a rigid insert bonded to said body within said bore, and an annular cavity extending axially into said base portion from the end face thereof, said cavity being disposed between said bore and said annular wall whereby restriction of said annular wall by the rim is accommodated by deformation of the rubber about and into said cavity.

7. A valve stem construction for a tubeless pneumatic tire rim comprising a rubber body portion adapted to project through and a distance radially outwardly of a rim valve hole and to fit against both sides of the edge thereof, a longitudinal air passageway through the stem, groove means in said body disposed circumferentially about and spaced radially from one end portion of said passageway and opening on the end of the body which projects radially outwardly of said rim valve hole, said groove means communicating with tire inflationary air when said rim and valve are in service with an inflated tubeless tire mounted on said rim, said groove means extending in depth axially of said body a distance beyond the portion thereof that fits against the sides of said valve hole.

References Cited in the file of this patent

UNITED STATES PATENTS

| | | |
|---|---|---|
| 2,049,252 | Eberhard | July 28, 1936 |
| 2,272,886 | Wilson | Feb. 10, 1942 |
| 2,309,430 | Albert | Jan. 26, 1943 |
| 2,634,785 | Tubbs | Apr. 14, 1953 |